United States Patent [19]

Lagneaux

[11] 4,220,259
[45] Sep. 2, 1980

[54] PROCESS AND APPARATUS FOR AT SITE PREPARATION OF BEVERAGES

[75] Inventor: Jean Lagneaux, Bourg-Argental, France

[73] Assignee: Societe Generale Pour L'Emballage, Paris, France

[21] Appl. No.: 974,554

[22] Filed: Dec. 29, 1978

[30] Foreign Application Priority Data

Dec. 30, 1977 [FR] France .................. 77 39838

[51] Int. Cl.³ ............................ B67B 7/28
[52] U.S. Cl. ........................ 222/82; 222/103
[58] Field of Search ............ 222/80, 82, 83, 103, 222/491, 212, 214

[56] References Cited

U.S. PATENT DOCUMENTS

| | | | |
|---|---|---|---|
| 3,189,227 | 6/1965 | Hobbs et al. | 222/107 X |
| 3,340,789 | 9/1967 | Simjian | 99/352 |
| 3,340,790 | 9/1967 | Simjian | 99/352 |
| 3,418,059 | 12/1968 | Robe | 222/107 X |
| 3,469,521 | 9/1969 | Simjian | 99/287 |
| 4,008,657 | 2/1977 | Yamamura et al. | 99/483 |

FOREIGN PATENT DOCUMENTS 1410288  8/1965 France .................. 99/352

*Primary Examiner*—Stanley H. Tollberg
*Attorney, Agent, or Firm*—Pennie & Edmonds

[57] ABSTRACT

The disclosed invention provides a process and apparatus for at site preparation of beverages using a new improved concentrate containing packet having a pressure rupturable inner seal positioned adjacent an exit port and within the boundary of a severable more permanent boundary seal. When a beverage is selected, the packet is positioned within a discharge mechanism provided with a severing member and pressure applicators wherein the packet is severed at the exit-port and intermediate the pressure rupturable inner seal and the severable more permanent boundary seal. Following the severing operation, the pressure applicators are activated to compress the packet thereby breaking the pressure rupturable inner seal and discharging the concentrate into a suitable container such as a cup where it may be blended with a liquid for consumption.

11 Claims, 10 Drawing Figures

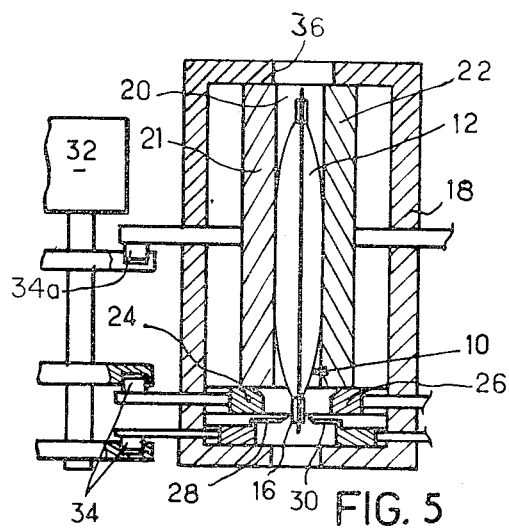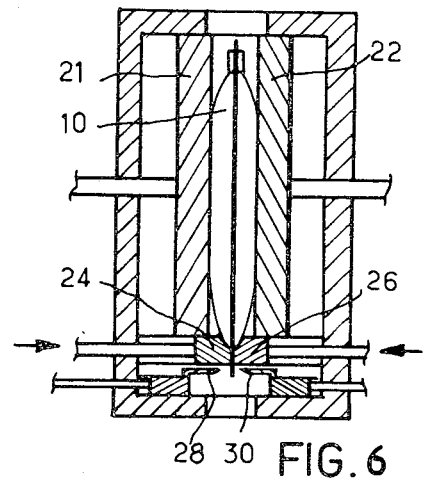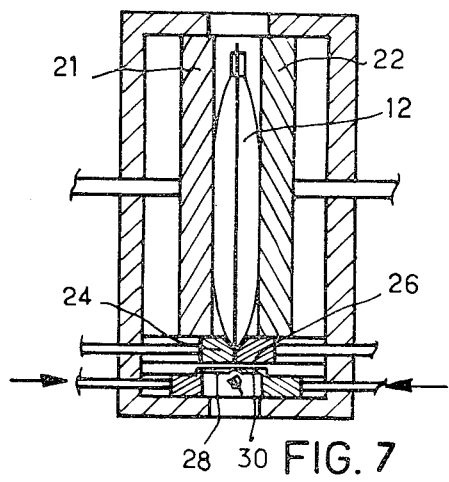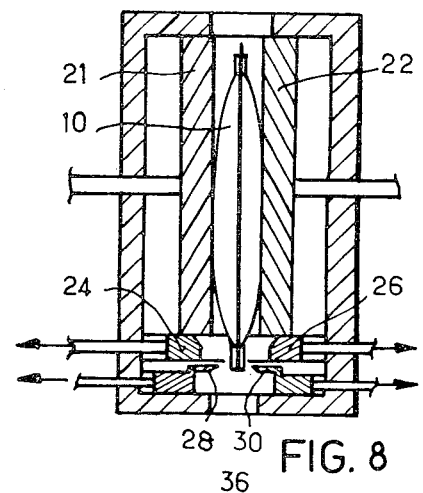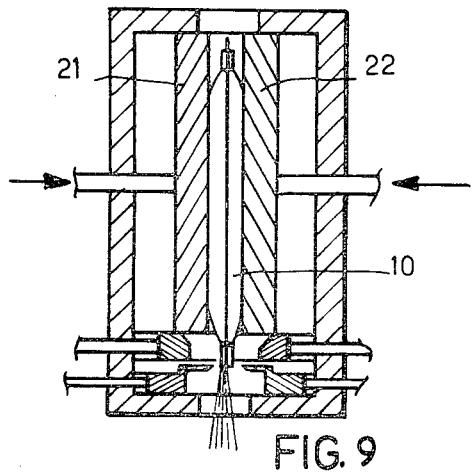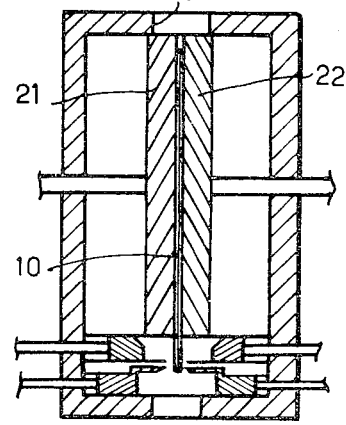

PROCESS AND APPARATUS FOR AT SITE PREPARATION OF BEVERAGES

TECHNICAL FIELD

The invention relates to a process and apparatus for at site preparation of beverages using a new improved concentrate containing packet having a pressure rupturable inner seal which is broken by a discharge mechanism having means for first severing an exit port and thereafter compressing the packet to break the rupturable inner seal for discharge of the contents into a container where the concentrate may be blended with a liquid for consumption.

BACKGROUND ART

Two processes are generally used to prepare beverages in dispensing machines for at site consumption. One process, which is older, involves storage of concentrates in large containers from which predetermined amounts are discharged and blended with a liquid for consumption. Each container delivers the same concentrate and correspondingly this process has drawbacks in that a limited number of beverages are available for selection by a consumer and the dispensing equipment is relatively large.

A second process known to the art uses conical cup-shaped packets formed of rigid heat-sealable film. The contents of these conical cup-shaped packets may be discharged by piercing the film and introducing a gas which discharges the contents when the conical tip of the packet is severed. This process makes it possible to include a wide variety of beverages for selection by a consumer. However, because of the complex configuration of these packets, special mechanisms are required with resulting problems for storage and processing. Also, the conical cup-shaped packets are relatively expensive to prepare and discharge of concentrates such as viscous syrups became difficult under low ambient temperature conditions.

It has now been found that by practice of the present invention, numerous disadvantages inherent in the prior art processes are overcome in a simple, efficient manner.

DISCLOSURE OF THE INVENTION

By practice of the present invention, a wide variety of beverages may be available for selection by a consumer by means of a new improved concentrate containing packet having a pressure rupturable inner seal positioned adjacent an exit port and within the boundary of a severable more permanent boundary seal.

The present packets may be prepared as a relatively thin container formed by border sealing a flexible material such as, for example, plastic films composed of polypropylene, polyethylene, polyesters, co-polymers thereof and the like. Semi-flexible laminates may also be used to prepare the present packets using materials such as, for example, laminates of polyethylene-aluminum-polyester, polyethylene-aluminum-lacquered paper and the like. The nature of the films may be selected for long storage protection of the contents, anticipated ambient conditions of moisture or temperature, costs of producing the packets, the efficiency of severing a portion, and the like.

Within the sealed border of flexible and semi-flexible material, there is positioned an exit or discharge port which includes a pressure rupturable seal.

The process of the present invention is characterized in that a packet of concentrate may be introduced into a discharge mechanism provided with a severing member and pressure applicators. The severing members are positioned to expose the discharge port without release of the concentrate which remains in the packet because of the rupturable seal. Following the severing step, the pressure applicators operate to squeeze the packet, break the rupturable seal, and release the contents to a container where it may be blended with a liquid for consumption.

According to an advantageous example, the dispensing machine for preparing unit portions of beverages according to the present invention, comprises a frame on which is mounted a press including two plates arranged approximately vertically, a seat formed on the frame and on which the packet can be placed and held between the press plates with the flow passage turned downwardly and projecting beyond the plates, two jaws mounted moveably toward one another under the plates disposed to lock the discharge port projecting under the plates and above the cup intended to receive the beverage, elements sectioning the end of the discharge port located under the jaws, means for expelling the empty bag from between the press plates and drive means of any suitable type disposed to control, in sequence, the approach and separation of the plates, jaws and sectioning elements.

The discharge mechanism of the present invention is characterized by a chamber configurated to receive a packet, severing means positioned to sever the discharge port of the packet without release of the concentrate, and pressure applicators to compress the packet for release of the concentrate to the container.

BRIEF DESCRIPTION OF THE DRAWINGS

Practice of the present invention will become more apparent from the following detailed description taken in conjunction with the figures wherein:

FIG. 5 is a diagrammatical side elevational view, in partial section, illustrating the positioning of the packet of FIG. 1 within the discharge mechanism of FIG. 4;

FIG. 6 is a similar view to that of FIG. 5 illustrating the clamping of the packet prior to severing of the discharge port;

FIG. 7 is a similar view to that of FIG. 5 illustrating the severing of the packet in the area of the discharge port;

FIG. 8 is a similar view to that of FIG. 5 illustrating the disengagement of the clamping and severing members from the packet;

FIG. 9 is a similar view to that of FIG. 5 illustrating the compression of the packet by the pressure applicators to effect discharge of the contents of the packet; and FIG. 10 is a similar view to that of FIG. 5 illustrating the packet and pressure applicators following discharge of the contents of the packet.

BEST MODE FOR CARRYING OUT THE INVENTION

Figure 1:
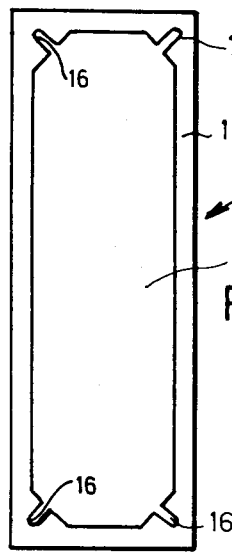
FIG. 1 is a front elevational view of a concentrate containing packet of the present invention.

In the figures wherein similar elements are identified by like numerals throughout the several views, FIG. 1 illustrates a packet 10 having side-walls 12 joined by a boundary or border seal 14. This border seal 14 may be accomplished by adhesive or heat fushion methods well known to the art.

Also, the contents of the packets may be liquid, paste, syrup or powder which conventionally serve to prepare beverages for at site consumption when mixed with liquids, carbonating gases or similar blending ingredients, including cooling ingredients such as crushed ice, if desired.

The packets may be filled with the concentrate using a variety of known techniques. Continuous filling methods are obviously preferred.

Figure 2:
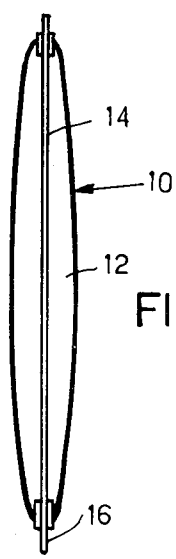
FIG. 2 is a side elevational view of the packet of FIG. 1.
Figure 3:
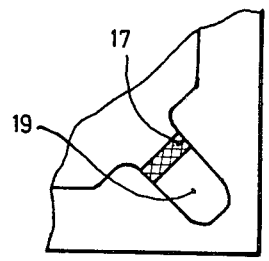
FIG. 3 illustrates a discharge port taken as a partial enlarged section of the packet of FIG. 1.

The packet may be configured in any of a wide variety of shapes such as for example, square, rectangular as represented in FIGS. 1 and 2, diamond-shape or the like. At one or more corner portions of packet 10, there is disposed a contents exit port or passage 16 which serves as a discharge passage for the contents after the cutting operation is performed. The existence of a passage at each of the corners of packet 10 makes it possible to position the packet correctly and without special orientation in the dispensing machine, as will be seen below. Advantageously, this passage 16 is blocked by a fusion 17 to create an empty zone 19. During use, zone 19 is severed, which avoids any risk of contamination of the severing elements. Fusion 17 then constitutes a weak point that gives away under the pressure of the concentrate during compression of the bag.

Figure 4:
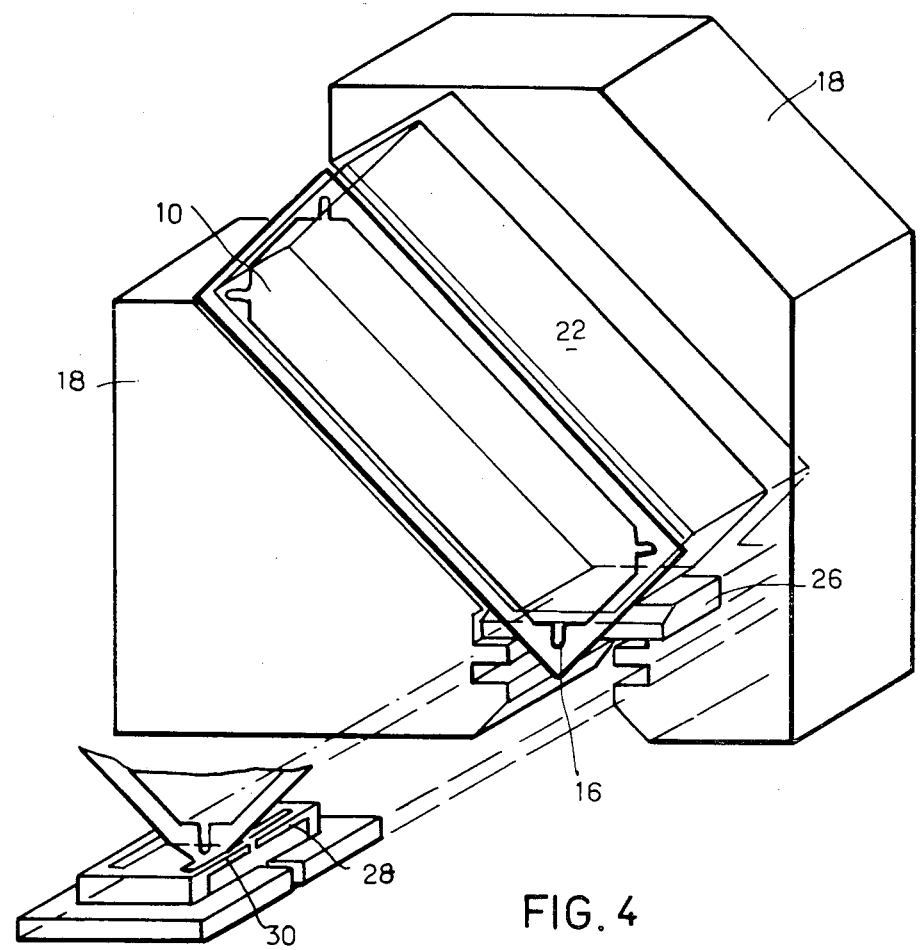
FIG. 4 is a partially exploded perspective view of a discharge mechanism of the present invention.

As shown in FIGS. 4 and 5, the dispensing machine for preparing beverages comprises frame 18 open in the lower part to allow passage of a corner portion of packet 10. The packet 10 is introduced into chamber 20 between pressure plates 21 and 22 which are disposed to slide horizontally, and which may be brought together or separated by suitable drive means. The pressure plates are positioned in a more or less vertical orientation by its two sides on frame 18.

As illustrated in FIG. 5, the lower corner portion of the packet 10 and the passage 16 that it contains, extend below plates 21 and 22 of the press. Two jaws 24 and 26 are mounted in frame 18 to slide in reciprocal movement so that in a closed position, they pinch the part of the corner portion of the packet which extends below the plates.

The severing means is illustrated as knives 28 and 30 mount-to slide on the frame under jaws 24 and 26. The knives operate to section the end of the flow passage that extends below the jaws.

The movement of pressure plates 21 and 22, jaws 24 and 26 and knives 28 and 30 is controlled either automatically, for example by a motor 32 and a cam transmission 34, or manually as desired whereby the electric motor is replaced by mechanical means such as a lever.

The dispensing apparatus may also include a wide variety of elements for treating the added liquid, namely, a cooling unit, a carbon dioxide gas saturator or a heating element, all not shown. Also, elements may be included for introducing empty cups to receive the beverage for consumption.

The operation of the apparatus is detailed in FIGS. 5 to 10. Packet 10 containing a concentrate is introduced between pressure plates 21 and 22 which, like jaws 24, 26 and knives 28 and 30 are in the withdrawn position (FIG. 5). As already explained, the packet 10 rests on frame 18 with its lower corner engaged in the opening of the frame.

Jaws 24 and 26 are then brought together and pinch the projecting corner of the packet (FIG. 6) to prevent the flow of the packaged product during the cutting operation. After locking of the corner, knives 28 and 30 are brought together and section the passage 16 (FIG. 7), thus opening up zone 19 to the outside.

The knives advantageously are made so that the cut off part remains partially attached to the bag. Thus, the cut off part is kept from falling into the cup which receives the blended beverage.

After the cutting operation, the knives move back, the jaws withdraw (FIG. 8), then plates 21 and 22 of the press compress the packet (FIG. 9) causing fusion 17 to rupture thereby effecting total expulsion of the contents (FIG. 10). Removal of the empty packet can be performed either manually by movement through an upper opening 36 of the frame or automaticaly by movement of the press plate unit opposite an evacuation chute parallel to the chamber such as by means of action of cams of which only cam 34a is shown by way of example.

The added blend liquid is delivered by a tap, not shown, directed so that mixing of the jets of added concentrate and liquid occurs during movement beginning at the start of their fall and ending in the receiving container.

The process and machine according to the present invention have the advantage of allowing the preparation of a different beverage at each drawing. The portions used are relatively inexpensive and are easy to handle and store.

This process is applicable to all cases where a concentrated product is to be mixed with an added liquid at a high rate and without the concentrated product being handled manually.

It will be readily apparent to those skilled in the art that a wide variety of variations may be made in the present apparatus and process without departing from practice of the invention disclosed herein.

What is claimed is:

1. A process for preparing beverages for at site consumption which comprises, positioning an ingredient containing packet in a discharge mechanism, said packet being compressible and configurated with a boundary seal and a contents discharge passage therein, the contents discharge passage having a pressure rupturable seal intermediate the contents and the boundary seal, securing the packet in the discharge mechanism, severing the packet at the contents discharge passage intermediate the boundary seal and the pressure rupturable seal, and thereafter compressing the packet whereby the pressure rupturable seal is broken and the content of the packet is released to a container with a blending liquid for consumption.

2. The process of claim 1 wherein the packet is secured by jaws disposed adjacent the severing location, said jaws being released prior to compressing the packet.

3. The process according to claim 1, wherein severing of the discharge passage is partial.

4. The process according to claim 1, wherein the blending liquid is combined with the contents expelled from the packet in the form of a jet directed toward the bottom of the the container.

5. An apparatus for preparing beverages for at site consumption which comprises, a frame defining a chamber configured to receive an ingredient containing packet having a boundary seal and a contents discharge passage, said discharge passage having an intermediate rupturable seal, means for securing the packet adjacent the discharge passage, severing means disposed to sever the packet intermediate the rupturable seal and the boundary seal without release of the contents, and pressure means disposed to compress the packet whereby the rupturable seal is broken and the contents of the packet is discharged to a blending zone where mixing is effected with a liquid prior to consumption.

6. The apparatus of claim 5 wherein the pressure means are defined by two plates disposed approximately vertically and movable to compress the packet, said securing means are defined by two jaws mounted to grip the packet, said severing means defined by movable blades disposed below the jaws, and drive means are disposed to sequentially engage the securing means prior to severing, and to disengage the securing means subsequent to severing.

7. The apparatus of claim 6 wherein the drive means include an electric motor disposed in combination with a shaft and cams which act in sequence on the pressure means, the securing means, and the severing means.

8. A packet containing contents for preparation of beverages for at site consumption comprising a chamber formed by a pair of walls of film material, said chamber enclosing the beverage contents between the walls and within a region of a boundary seal, at least one passage within said seal region providing an open directional discharge path for contents from said chamber, and a seal rupturable upon pressurization of said chamber located within said passage initially for isolating a distal end of the passage from a proximal end at the chamber, said rupturable seal being spaced from the distal end of the passage by a distance so that severance of the distal end will open the passage and provide a length of passage from the severed end to the rupturable seal whereby in use of said packet when the distal end is severed and said chamber is pressurized said rupturable seal will rupture permitting directional discharge of the contents through said passage.

9. The packet of claim 8 having a multiple number of discharge passages.

10. The packet of claim 8 wherein the film is plastic or plastic laminate.

11. The packet of claim 8, 9 or 10 wherein the configuration is square, rectangular or diamond-shaped.

* * * * *